Oct. 27, 1931. R. PUDELKO ET AL 1,829,367
ELECTRICITY METER
Filed Jan. 11, 1930
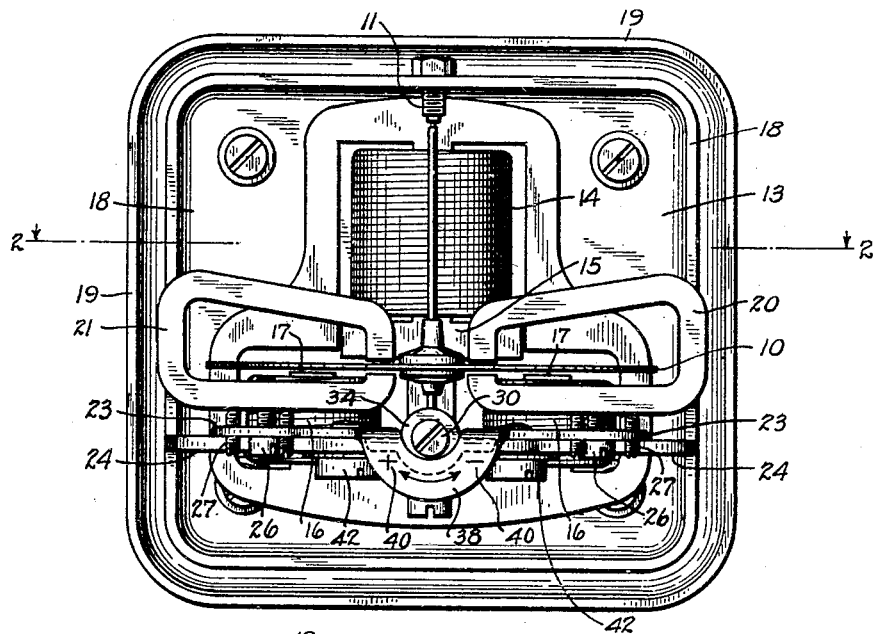
Fig. 1
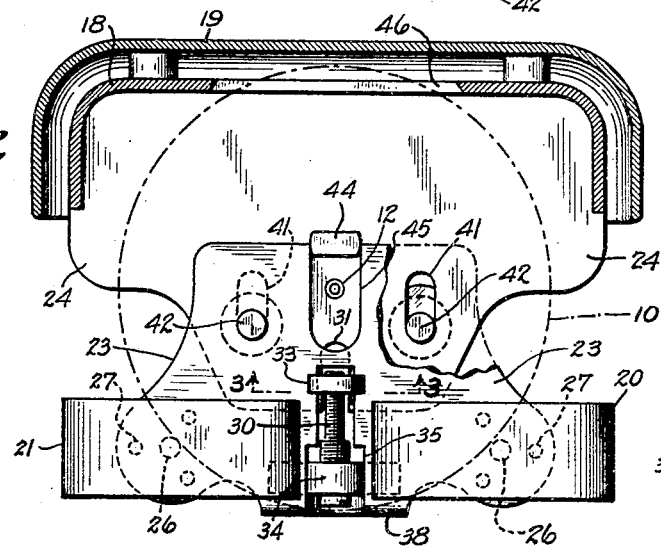
Fig. 2
Fig. 5
Fig. 3
Fig. 4
INVENTORS:
Riccard Pudelko
Paul Moos
BY John S Morgan
ATTORNEY Patented Oct. 27, 1931

1,829,367

UNITED STATES PATENT OFFICE

RICCARD PUDELKO AND PAUL MOOS, OF ZUG, SWITZERLAND, ASSIGNORS TO LANDIS & GYR, A.-G., A CORPORATION OF SWITZERLAND

ELECTRICITY METER

Application filed January 11, 1930, Serial No. 420,101, and in Switzerland January 22, 1929.

The present invention relates to electricity meters and more particularly to a mounting for the brake magnet of electricity induction meters for varying the braking force exerted by the magnet and for maintaining the braking magnet in the desired adjusted position.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a front elevation of one embodiment of an electricity meter illustrative of the present invention;

Fig. 2 is a horizontal section taken on the line 2—2 of Fig. 1, with the meter coils, cores and driving disc removed, and with other parts broken away;

Fig. 3 is a detailed vertical section taken on the line 3—3 of Fig. 2;

Fig. 4 is a detailed fragmentary plan of the base plate of the meter frame; and

Fig. 5 is a detailed elevation of one part of the apparatus.

According to the present invention, there are preferably provided a pair of braking magnets for exerting a braking force on the rotatable metering disc of the induction meter, as the disc is rotated by the driving magnets of the meter, and these braking magnets are mounted on a magnet-supporting plate with their poles on either side of the metering disc. These braking magnets and the supporting plate on which they are mounted are preferably slidable upon the base plate of the meter frame so that the braking magnets and supporting plate may be moved radially of the metering disc to vary the braking force applied to the metering disc. Means are also preferably provided for minutely moving the magnets and supporting plate relative to the metering disc and as embodied, these means comprise a differential screw connected between the supporting plate and base plate, and preferably having its axis lying in the plane of the supporting plate, so that as the screw is rotated the relative position of the magnets to the metering disc is varied by a radial movement of the magnets and supporting plate.

In the present embodiment, means are also preferably provided for guiding the supporting plate and magnets as they are moved on the base plate of the meter frame and for allowing them to be moved only in a straight path, and other means are provided for securely fastening and holding the braking magnets in the desired position relative to the metering disc thereby maintaining the accurate adjustment of the braking force applied to the metering disc. According to another feature of the present invention, the meter frame is preferably spaced from the back cover of the meter and provided with a slot radially alined with the metering disc, and into which, or through which, the metering disc projects, thereby diminishing the size of the meter frame.

Other features of the invention will be initially pointed out in connection with the following detailed description of the present preferred embodiment of the invention, and it will be understood that the foregoing general description and the following detailed description are both exemplary and explanatory, but not restrictive of the invention.

Referring now in detail to the present preferred embodiment of the invention as shown in the accompanying drawings, the invention is shown as applied to an electric induction meter of the Ferrari type having a metering disc 10 rotatably journalled in suitable bearings 11 and 12 in the upper and lower reaches of the meter frame 13, the disc 10 being driven proportionately to the energy consumed in the circuit with which the meter is used by means of the usual driving magnets comprising the voltage coil and core 14 and 15, and the current coils and cores 16 and 17. The coils and cores 14, 15, 16 and 17 are preferably securely fastened to the intermediate upright portion 18 of the meter frame 13, the meter frame in turn being spaced from and rigidly supported upon the back cover 19 of the meter.

For controlling the rotation of the meter, braking means are preferably provided acting on the metering disc 10, and these means preferably comprise a pair of braking magnets 20, 21, having their air gaps adjacent to each other and their pole pieces on either side of the metering disc 10, and preferably supported in this position by a magnet supporting plate 23, fastened to a base plate 24 of the meter frame, by means of screws 26 and leveling screws 27.

As shown in the drawings, the braking magnets are of such a size and are so positioned with respect to the metering disc 10 and its supporting spindle, that the metering disc and spindle can be bodily moved between the magnets and through the air gaps of the magnets into running position, or bodily removed therefrom for replacement or repair.

In the present embodiment, the braking magnets 20 and 21 are preferably movable in a generally radial direction with respect to the metering disc 10 and for this purpose the magnet supporting plate 23 is slidable and radially movable with respect to the metering disc upon the base plate 24 of the meter frame by which the magnets and magnet supporting plate are supported. For minutely moving the magnets and magnet supporting plate on the base plate 24 and with respect to the metering disc 10, the base plate is preferably connected with the magnet supporting plate by means of a differential screw 30, having its axis lying in the plane of the magnet supporting plate. This screw mechanism is preferably of the following general construction:—

The base plate 24 at its front end is provided with a slot 31 of sufficient size to accommodate the differential screw 30, and this slot is preferably formed with a notch 32 at either side thereof to receive the nut 33 into which the differential screw 30 is threadedly secured. The other end of the differential screw, and preferably the outer end thereof, is threadedly secured in a bridge piece 34 extending across a slot 35 formed in the magnet supporting plate and secured to plate 23 in any suitable manner, as by welding. Slot 35 preferably extends rearwardly for a distance slightly in excess of that of the length of the differential screw 30 and nut 33 is preferably provided with a pair of alined slots 36 on either side of screw 30 adapted to fit over the edges of supporting plate 23, thereby allowing the nut to be moved along the slot 35 in plate 23, and at the same time preventing turning of the nut as the differential screw 30 is turned to slide the plate 23 on base plate 24 and vary the position of the magnets relative to the metering disc 10, the nut 33 being held against axial movement relative to the base plate 24, by the notches 32 into which it is tightly fitted.

The forwardly extending edge of the magnet supporting plate 23 may be turned down as at 38 to render the head of the differential screw 30 more easily accessible, and may be provided with indicia 40 to guide one in the adjustment of the braking magnets of the meter.

For guiding the magnet supporting plate as it is moved over the base plate 24, there are preferably provided a pair of parallel slots 41 in the base plate 24 through which slots project guiding and holding screws 42 which are threaded into threaded apertures in the magnet supporting plate 23, and these screws may be tightened to securely hold the magnets and magnet supporting plate in any adjusted position after the braking magnets have been correctly positioned with respect to the metering disc 10, thereby tightly clamping the supporting plate 23 against the base plate 24. For insuring the movement of the braking magnets and the supporting plate 23 in a straight line and in a generally radial direction with respect to the metering disc 10, there is provided a guiding boss 44 secured to the base plate 24 and lying in a slot 45 at the rear of the magnet supporting plate 23. As shown in the preferred embodiment, the boss 44 is preferably out of alinement with the guiding screws 42.

For reducing the overall dimensions of the meter and meter frame, the intermediate portion 18 of the meter frame, lying at the rear of the meter is preferably provided with a narrow relatively long slot 46, radially alined with the metering disc, and the bearings 11, 12 are so positioned, and the disc 10 is of such a size that its edge projects through the slot 46 and extends slightly into the space between the intermediate portion 18 of the meter frame and the back cover 19 of the meter, thereby enabling a larger metering disc to be employed, without materially increasing the bulk of the meter.

The invention in its broader aspects is not limited to the specific mechanisms shown and described but departures may be made therefrom within the scope of the accompanying claims without departing from the principles of the invention and without sacrificing its chief advantages.

What we claim is:—

1. Braking means for the movable disc of an electricity meter including in combination a pair of braking magnets, a movable plate on which the magnets are supported, means for moving the plate and magnets relatively to the disc and guide means for preventing movement of the plate out of a straight path.

2. Braking means for the movable disc of an electricity meter including in combination a braking magnet, a movable plate on which the magnet is supported with its pole pieces on either side of the disc, a screw having its axis in the plane of the plate for moving the plate and magnet radially of the disc to vary the braking force exerted on the disc.

3. Braking means for the movable disc of an electricity meter including in combination a braking magnet, a movable plate on which the magnet is supported with its pole pieces on either side of the disc, a base plate on which the plate is slidably mounted and a differential screw attached to the base plate and the movable plate for moving the movable plate and magnet relative to the disc.

4. Braking means for the movable disc of an electricity meter including in combination a braking magnet, a movable plate on which the magnet is supported with its pole pieces on either side of the disc, a base plate on which the movable plate is slidably mounted, a screw attached to the base plate and connected with the movable plate for moving the movable plate relative to the disc, guiding means for guiding the movable plate as it is moved on the base plate and means for locking the movable plate and magnet in adjusted position.

5. Braking means for the movable disc of an electricity meter including in combination a pair of braking magnets, a movable plate on which the magnets are supported with their pole pieces on either side of the disc, a base plate on which the movable plate is slidably mounted, guiding means on the movable plate and base plate for guiding the movable plate, and a differential screw attached to the base plate and supported by the movable plate and having its axis in the plane of the movable plate for variably positioning the movable plate and magnets relative to the disc.

6. Braking means for the movable disc of an electricity meter including in combination a braking magnet, a movable plate on which the magnet is supported, a base plate on which the movable plate is slidably mounted, guiding means for guiding the movable plate in a straight line and means for locking the movable plate and magnet in adjusted position.

In testimony whereof, we have signed our names to this specification.

RICCARD PUDELKO.
PAUL MOOS.